United States Patent
Lee et al.

(10) Patent No.: US 9,449,575 B2
(45) Date of Patent: Sep. 20, 2016

(54) SCREEN OUTPUT CONTROL METHOD AND SYSTEM, AND MOBILE TERMINAL SUPPORTING THE SAME

(71) Applicant: Samsung Electronics Co. Ltd., Suwon-si, Gyeonggi-do (KR)

(72) Inventors: Gwanglim Lee, Seongnam-si (KR); Sangjin Lee, Ansan-si (KR); Soochan Lim, Hwaseong-si (KR); Carsten Haitzler, Seoul (KR); Minsu Han, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 165 days.

(21) Appl. No.: 14/022,702

(22) Filed: Sep. 10, 2013

(65) Prior Publication Data

US 2014/0071145 A1    Mar. 13, 2014

Related U.S. Application Data

(60) Provisional application No. 61/698,895, filed on Sep. 10, 2012, provisional application No. 61/700,125, filed on Sep. 12, 2012, provisional application No. 61/700,107, filed on Sep. 12, 2012.

(30) Foreign Application Priority Data

Sep. 20, 2012  (KR) .................. 10-2012-0104795

(51) Int. Cl.
G09G 5/36     (2006.01)
G06F 12/02    (2006.01)
G06T 1/60     (2006.01)
G09G 5/00     (2006.01)
G09G 5/395    (2006.01)
G06F 3/14     (2006.01)
G09G 5/14     (2006.01)

(52) U.S. Cl.
CPC ............. *G09G 5/003* (2013.01); *G06F 3/1431* (2013.01); *G06T 1/60* (2013.01); *G09G 5/14* (2013.01); *G09G 5/395* (2013.01); *G09G 2370/12* (2013.01)

(58) Field of Classification Search
None
See application file for complete search history.

(56) References Cited

U.S. PATENT DOCUMENTS

| | | | | |
|---|---|---|---|---|
| 2002/0010844 | A1* | 1/2002 | Noel | G06F 9/5077 711/153 |
| 2003/0221071 | A1* | 11/2003 | McKenney | G06F 9/526 711/152 |
| 2005/0168471 | A1* | 8/2005 | Paquette | 345/536 |
| 2009/0309808 | A1* | 12/2009 | Swingler | 345/1.3 |
| 2013/0076594 | A1* | 3/2013 | Sirpal | G06F 3/0488 345/1.3 |

* cited by examiner

*Primary Examiner* — Jacinta M Crawford
(74) *Attorney, Agent, or Firm* — Jefferson IP Law, LLP

(57) ABSTRACT

A screen output control method and system and a mobile terminal supporting the same are provided. The screen output control system includes a screen output device and a mobile terminal. The screen output device is connected with the mobile terminal so as to output screen data rendered by the mobile terminal. When the screen output device is connected, the mobile terminal renders screen data for the screen output device, writes the rendered screen data to a buffer assigned to the screen output device, and outputs screen data written in the buffer to the screen output device.

22 Claims, 12 Drawing Sheets

SCREEN OUTPUT CONTROL METHOD AND SYSTEM, AND MOBILE TERMINAL SUPPORTING THE SAME

CROSS-REFERENCE TO RELATED APPLICATION(S)

This application claims the benefit under 35 U.S.C. §119(e) of U.S. Provisional applications filed on Sep. 10, 2012 in the U.S. Patent and Trademark Office and assigned Ser. Nos. 61/698,895 and 61/698,969, and U.S. Provisional applications filed on Sep. 12, 2012 in the U.S. Patent and Trademark Office and assigned Ser. Nos. 61/700,125 and 61/700,107, and under 35 U.S.C. §119(a) of a Korean patent application filed on Sep. 20, 2012 in the Korean Intellectual Property Office and assigned Serial No. 10-2012-0104795, the entire disclosures of each of which is hereby incorporated by reference.

TECHNICAL FIELD

The present disclosure relates to screen output control for a mobile terminal. More particularly, the present disclosure relates to a screen output control method and system and a mobile terminal supporting the same wherein information output to a display unit of the mobile terminal and a screen output device connected with the mobile terminal is efficiently controlled.

BACKGROUND

Mobile terminals supporting user functions have entered into widespread use in business and daily life due to small sizes thereof enabling ease of portability. Recently developed mobile terminals support a variety of user functions in an integrated manner. When a specific user function is activated, such a mobile terminal provides a screen corresponding to the user function through a display unit. Hence, a user may use a specific user function to enjoy content through a screen corresponding to the user function.

A mobile terminal may transfer content to an external screen output device through an external device interface. For example, a mobile terminal receiving broadcast data may display the broadcast data on a display unit of the mobile terminal and on a screen output device connected to the mobile terminal. Such an existing screen output function, which simply outputs information output by a mobile terminal on a screen output device, has failed to attract much attention because it has no more effect than viewing information through a larger screen. Nevertheless, as linkage between a mobile terminal and a screen output device may offer great potential in user convenience, it is necessary to develop a new screen output feature.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure address at least the above-mentioned problems and/or disadvantages to provide at least the advantages described below. Accordingly, an aspect of the present disclosure is to provide a screen output control method and system and a mobile terminal supporting the same wherein a desktop mode is supported for the mobile terminal and information output to the mobile terminal and a screen output device connected with the mobile terminal is efficiently managed.

In accordance with an aspect of the present disclosure, a screen output control system is provided. The screen output control system includes a screen output device and a mobile terminal, wherein the screen output device is connected with the mobile terminal so as to output screen data rendered by the mobile terminal, and wherein, when the screen output device is connected, the mobile terminal renders screen data for the screen output device, writes the rendered screen data to a buffer assigned to the screen output device, and outputs screen data written in the buffer to the screen output device.

In accordance with another aspect of the present disclosure, a method for screen output control is provided. The method includes allocating, when a screen output device is connected with a mobile terminal, window buffers to the screen output device, writing, according to rendering of an application running on the mobile terminal, one or more windows forming a screen to be output to the screen output device to the window buffers, compositing windows written in the window buffers and copying the composited information to a screen buffer, and outputting information in the screen buffer to a display area of the screen output device.

In accordance with another aspect of the present disclosure, a method for screen output control is provided. The method includes connecting a screen output device with a mobile terminal, allocating, according to rendering of an application running on the mobile terminal, a section of a screen buffer to which one or more windows forming a screen to be output to the screen output device are to be written, writing rendered windows directly to the screen buffer, and outputting information in the screen buffer to a display area of the screen output device.

In accordance with another aspect of the present disclosure, a mobile terminal supporting screen output control is provided. The mobile terminal includes an external interface unit to support connection with a screen output device, and a control unit to control a process of allocating, when the screen output device is connected, window buffers to the screen output device, writing, according to rendering of an application running on the mobile terminal, one or more windows forming a screen to be output to the screen output device to the window buffers, compositing windows written in the window buffers and copying the composited information to a screen buffer, and outputting information in the screen buffer to a display area of the screen output device.

In accordance with another aspect of the present disclosure, a mobile terminal supporting screen output control is provided. The mobile terminal includes an external interface unit to support connection with a screen output device, and a control unit to control a process of, when the screen output device is connected with the external interface unit, allocating, according to rendering of an application running on the mobile terminal, a section of a screen buffer to which one or more windows forming a screen to be output to the screen output device are to be written, writing rendered windows directly to the screen buffer, and outputting information in the screen buffer to a display area of the screen output device.

In a feature of the present disclosure, the screen output control method and system enable a mobile terminal to efficiently transfer display data to a screen output device so that the screen output device may display not only the same data as the mobile terminal but also other data.

In particular, various embodiments of the present disclosure enable efficient realization of screen output control so that system and memory efficiency can be enhanced and screen output performance can be increased.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
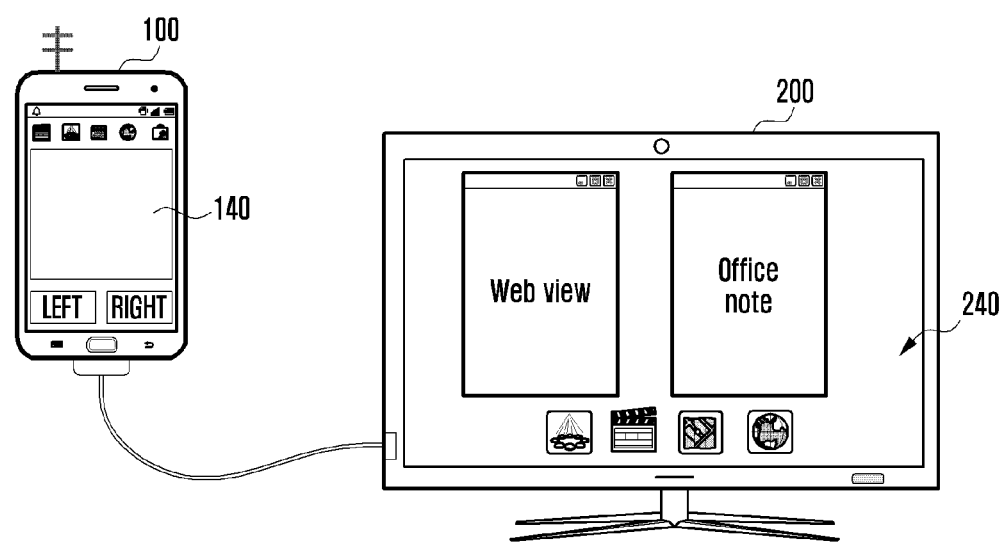
FIG. 1 illustrates an architecture of a screen output control system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to various embodiments of the present disclosure, a "window" corresponds to at least one screen layer constituting one screen. For example, a window of an indicator region, a window of a shortcut icon region, and a window of a menu icon region may each be a window acting as a screen layer. According to activation of an application, an application supporter (described later) may render screen layers corresponding to individual windows. Hence, such windows may be arranged so as to overlap each other or be placed at suitable positions to thereby form a screen.

A window buffer may be a buffer into which a window is written. A window written in a window buffer may be copied into a combined screen buffer or a screen buffer. Screen data copied into a combined screen buffer or a screen buffer may be output to a display unit of a mobile terminal or to a display area of a screen output device. To this end, each of a combined screen buffer and a screen buffer may be partitioned into regions corresponding to the display unit and the display area of the screen output device. When an application is activated and windows are rendered, window buffers and screen buffers may be allocated to output screen data composed of windows. Particularly, in the present disclosure, buffer allocation for the display unit and buffer allocation for the screen output device may be performed. Screen data to be output to the screen output device is written in a buffer allocated to the screen output device. In desktop mode (described later), screen data written in a buffer allocated to the screen output device may have a composition different from that of screen data written in a buffer allocated to the display unit of the mobile terminal.

Hereinafter, a description will be given of output by window buffer allocation, writing of windows rendered by an application in buffers and compositing of windows, and output by direct writing of windows rendered by an application in screen buffers without using window buffers and a composite window manager. The screen output control system of the present disclosure may selectively apply the above output schemes to the display unit of a mobile terminal and a screen output device.

FIG. 1 illustrates an architecture of a screen output control system according to an embodiment of the present disclosure.

Referring to FIG. 1, the screen output control system 10 may include a mobile terminal 100 and a screen output device 200.

In the screen output control system 10 having the above configuration, the mobile terminal 100 composites screens that are to be output to a display unit 140 of the mobile terminal 100 and a display area 240 of the screen output device 200. In this process, when screen data to be updated is present in the display unit 140 and the display area 240, window buffers and combined screen buffers supporting screen output to the display unit 140 and display area 240 may be selectively used. In particular, when screen data to be updated is present in one of the display unit 140 and the display area 240, the screen output control system 10 may freeze or deallocate window buffers and combined screen buffer sections related to the other, enabling more efficient screen information processing.

To this end, the mobile terminal 100, which includes a display unit 140 and a control unit controlling information output to the display unit 140, may output various screen data on the display unit 140 according to generation of a user request, pre-scheduled event, or communication event. In particular, the mobile terminal 100 may be connected with the screen output device 200, and may composite screen data to be sent to the screen output device 200 and output the screen data to the screen output device 200. The mobile terminal 100 may have a wired connection with the screen output device 200 through a High-Definition Multimedia Interface (HDMI), Universal Serial Bus (USB) or Universal Asynchronous Receiver/Transmitter (UART) cable. The mobile terminal 100 may have a wireless connection with the screen output device 200 through wireless local area or short-range communication based on Bluetooth, Ultra-wide-band (UWB) or Wi-Fi. Connection between the mobile terminal 100 and the screen output device 200 may be achieved through any communication scheme that can support provision of screen data from the mobile terminal 100 to the screen output device 200 and selective control of buffers for screen data transmission and update. Composition of screen data specific to the screen output device 200 and selective control of buffers for screen data transmission and update are described in more detail later with reference to the configuration and operation of the mobile terminal 100.

The screen output device 200 may be a monitor or the like, and is configured to be connected with the mobile terminal 100 to receive screen data composed by the mobile terminal 100 for output. In particular, when connected with the mobile terminal 100, the screen output device 200 provides device information to the mobile terminal 100 so that the mobile terminal 100 may compose screens specific to the screen output device 200. Here, the device information of the screen output device 200 may include screen size information, supported resolution information, and frequency range information for output. The screen output device 200 may receive screen data from the mobile terminal 100 and display the screen data on the display area 240. In particular, the screen output device 200 is configured to support a desktop mode of the mobile terminal 100. Here, when screen data of the mobile terminal 100 is updated, the screen output device 200 may output the updated screen data in the display area 240; or when screen data update of the mobile terminal 100 is locked, the screen output device 200 may not separately perform screen data update.

An HDMI cable may be used to connect the mobile terminal 100 with the screen output device 200, and acts as a communication link for device information sent from the screen output device 200 to the mobile terminal 100 and for screen data sent from the mobile terminal 100 to the screen output device 200. As described before, the HDMI cable may be replaced with a different cable or other wireless connection. The HDMI cable may use a separate power source to draw power needed for screen data transfer between the mobile terminal 100 and the screen output device 200. That is, for data transmission, the HDMI cable may draw power not from the mobile terminal 100 but from a separate power source. The HDMI cable may use the separate power source to charge the mobile terminal 100. To this end, the HDMI cable may be accompanied by a separate cord cable, which may serve as a power supply when plugged into an outlet.

Figure 2:
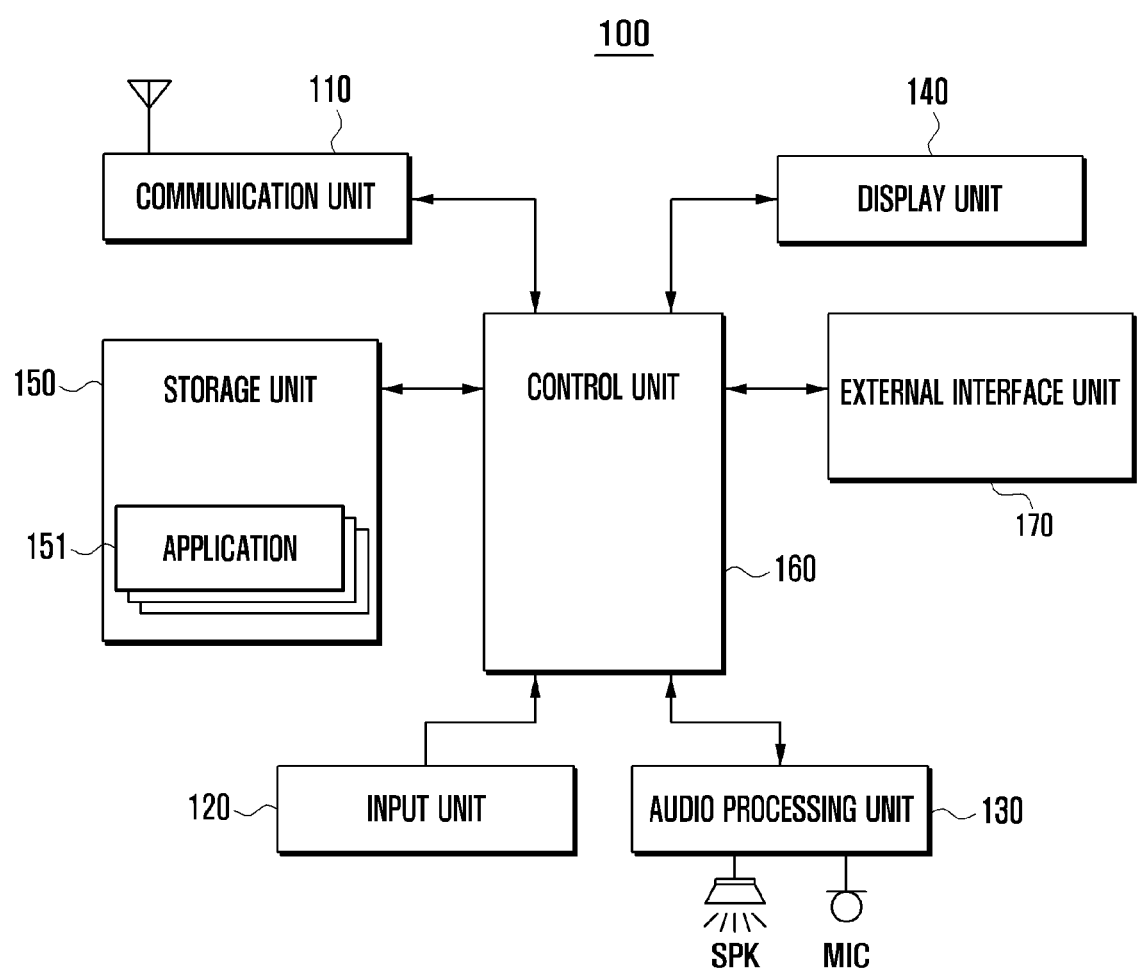
FIG. 2 is a block diagram of a mobile terminal shown in FIG. 1 according to an embodiment of the present disclosure.

FIG. 2 is a block diagram of a mobile terminal shown in FIG. 1 according to an embodiment of the present disclosure.

Referring to FIG. 2, the mobile terminal 100 may include a communication unit 110, an input unit 120, an audio processing unit 130 having both a speaker and a microphone, a display unit 140, a storage unit 150, an external interface unit 170, and a control unit 160.

The mobile terminal 100 is connected with the screen output device 200 via the external interface unit 170. When an HDMI cable is used for connection to the screen output device 200, the external interface unit 170 may include an HDMI interface. In a state in which the mobile terminal 100 composes screen data to be output to the display unit 140, when the screen output device 200 is connected and a desktop mode is selected, the mobile terminal 100 may compose separate screen data to support the desktop mode and output the separate screen data to the screen output device 200. Screen data for the screen output device 200 may be composed independently of screen data output to the display unit 140 and have properties unique to the screen output device 200. Hence, the user may perform various tasks on the basis of screen data output on the screen output device 200 separately from screen data output on the display unit 140 of the mobile terminal 100, and may use the mobile terminal 100 supporting input functions to control screen data output on the screen output device 200.

The communication unit 110 is configured to support communication of the mobile terminal 100. In response to a user request, the communication unit 110 may connect to an external sever apparatus and receive a server page from the external sever apparatus. Here, the server page may be a webpage based on a web browser or may be a cloud service page when connected to a cloud service apparatus. Under control of the control unit 160, the communication unit 110 may forward the received server page not to the display unit 140 but to the screen output device 200 for output. The communication unit 110 may establish a communication channel to support various communication functions related to voice calls, video calls, messages, instant messages, data services and the like. In response to a preset event, the communication unit 110 may establish at least one communication channel to send and receive data through the communication channel. When the mobile terminal 100 is designed so as not to support communication, the communication unit 110 may be omitted from the mobile terminal 100. When the mobile terminal 100 is wirelessly connected with the screen output device 200, the communication unit 110 may be used to establish a corresponding wireless communication channel. To this end, the screen output device 200 may further include a communication module and an operation supporter to exchange data with the communication unit 110.

The input unit 120 is configured to generate input signals for controlling the mobile terminal 100. The input unit 120 may include a key button, a side key, a home key and the like arranged at various portions of the mobile terminal 100 such as the bezel, front or back thereof. The input unit 120 may include a touch map on a touch panel and a display panel constituting the display unit 140 according to the type of the mobile terminal 100. The input unit 120 may be used to generate an input signal for controlling the mobile terminal 100 (e.g. desktop mode selection), an input signal for invoking a virtual keypad to control the screen output device 200, an input signal for controlling the screen output device 200 using the virtual keypad, and an input signal for controlling screen data output on the display unit 140.

The input unit 120 may further include external input devices. For example, a mouse and a keyboard may be attached to the mobile terminal 100. In this case, the mouse and keyboard may act as input devices. Here, the mobile terminal 100 may support a USB connector or Bluetooth module for wired or wireless connection, and the mouse and keyboard may be connected to the mobile terminal 100 through the USB connector or Bluetooth module and may send an input signal corresponding to user manipulation to the control unit 160. The control unit 160 may apply an input signal received from the mouse or keyboard to the display unit 140 or to the screen output device 200 in the desktop mode. When the mobile terminal 100 is configured to automatically enter the desktop mode after being connected to the screen output device 200 through the external interface unit 170 and receiving device information from the screen output device 200, generation of an input signal for desktop mode selection may be omitted.

The display unit 140 may output various screens in the course of using the mobile terminal 100. For example, the display unit 140 may output a broadcast reception screen, file search screen, file playback screen, communication service reception screen or the like. Under control of the control unit 160, when the screen output device 200 is connected, the display unit 140 may output a screen independently of the screen output device 200 or a screen for controlling the screen output device 200. In particular, under control of the control unit 160, an update lock may be set on a screen output on the display unit 140 so that screen data update is not performed. Under control of the control unit 160, the display unit 140 may perform screen data update independently of the screen output device 200. Execution of a user function scheduled to output a screen on the display unit 140 may cause screen data update. To display data produced by the user function on the display unit 140, the data may be written to both a window buffer and a combined screen buffer or written directly to a combined screen buffer without use of a window buffer.

The storage unit 150 may store various programs used for operation of the mobile terminal 100, such as an operating system, broadcast reception program, and mobile communication support program. The storage unit 150 may store various applications 151 supporting user functions, such as a web browser, word processor, gallery viewer, and video player.

Such applications 151 may be represented as menu items on the display unit 140 for user selection. When the user generates an input event for selection of a menu item, the control unit 160 may activate an application 151 associated with the selected menu item and output a corresponding screen on the display unit 140 and the screen output device 200. Each application 151 may produce screen data that can be output to the display unit 140 and to the screen output device 200. That is, an application 151 may include a routine for producing screen data to be output to the display unit 140 of the mobile terminal 100, and a routine for producing screen data to be output to the screen output device 200. Alternatively, an application 151, provided in the storage unit 150, may include a routine for producing screen data to be output to the display unit 140 of the mobile terminal 100 and a separate routine for converting screen data to be output to the display unit 140 into screen data to be output to the screen output device 200 (for example, composite window manager). An application 151 may be configured to output screen data to the display unit 140 and output screen data to the screen output device 200 when the screen output device 200 is connected, by default or according to output settings.

The control unit 160 supports power supply and distribution and signal exchange and processing for proper operation of the mobile terminal 100. For example, when a screen output device 200 is connected to the external interface unit 170, the control unit 160 may determine the type of the screen output device 200 and screen data to be sent thereto on the basis of device information provided by the screen output device 200. That is, the control unit 160 may determine the size and resolution of a screen to be sent to the screen output device 200, and the frequency to be used for screen output. During screen data output to the screen output device 200, the control unit 160 may control buffer allocation and update. Specifically, to output screen data to the screen output device 200 and the display unit 140, the control unit 160 may operate both window buffers and combined screen buffers or operate combined screen buffers only without use of window buffers. This is described in more detail with reference to FIGS. 3 and 4.

Figure 3:
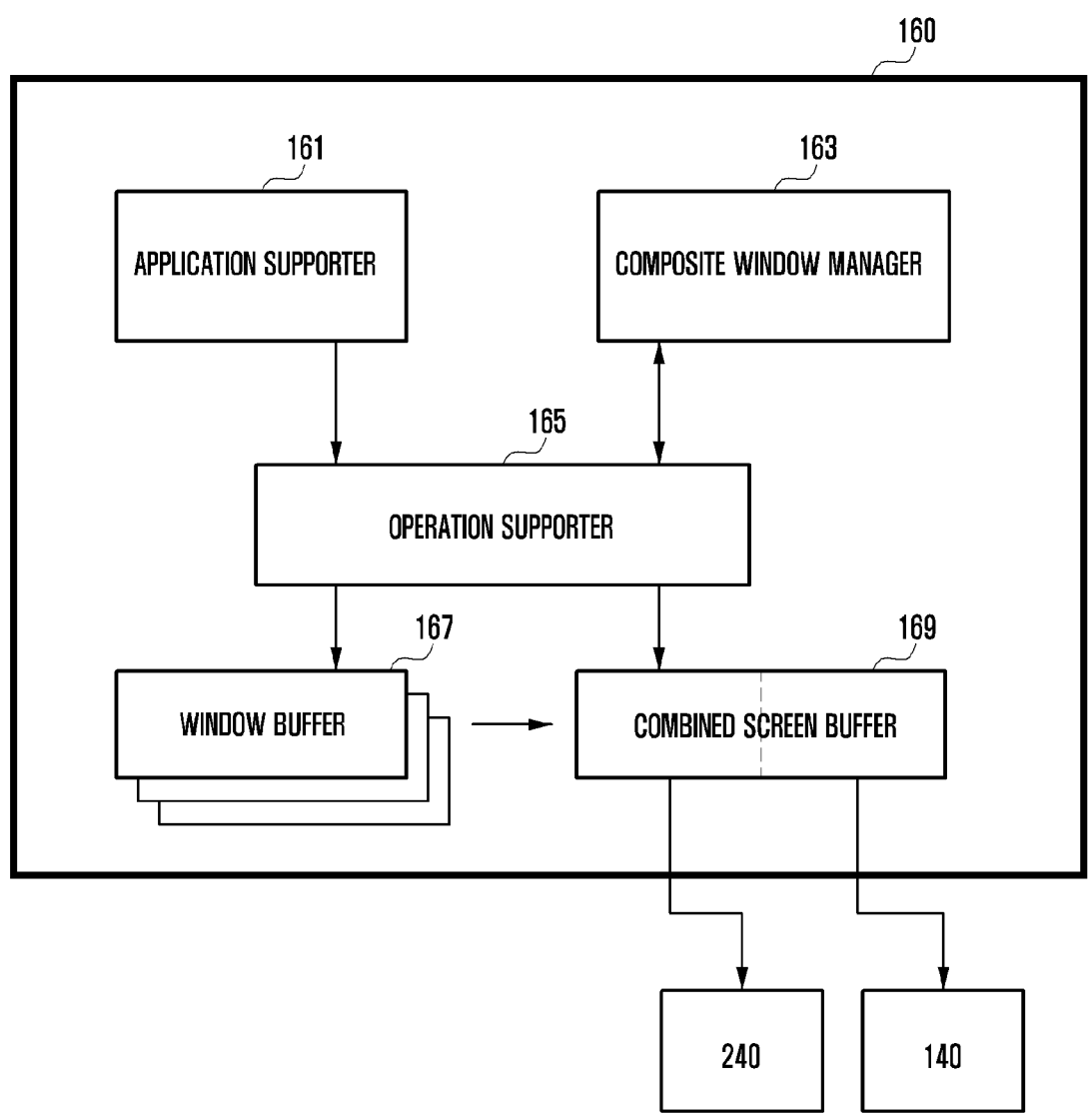
FIG. 3 illustrates a configuration of a control unit supporting screen output control according to an embodiment of the present disclosure.

FIG. 3 illustrates a configuration of a control unit supporting screen output control according to an embodiment of the present disclosure.

Referring to FIG. 3, the control unit 160 may include an application supporter 161, a composite window manager 163, an operation supporter 165, window buffers 167, and combined screen buffers 169. Here, although the window buffer 167 and combined screen buffer 169 may be arranged in the storage unit 150, they are depicted as being arranged in the control unit 160 to clearly indicate that they are operated under control of the control unit 160. The window buffer 167 and the combined screen buffer 169 may be provided as separate entities in the control unit 160, and the combined screen buffer 169 may correspond to a separate frame buffer providing screen data to the display unit 140. That is, although the window buffer 167 and combined screen buffer 169 are arranged in the control unit 160, the present disclosure is not limited thereto. The window buffer 167 and the combined screen buffer 169 may be realized as frame buffers, other buffers, or memory elements in the control unit 160 according to design.

The application supporter 161 may activate at least one of the applications 151 stored in the storage unit 150 and may support rendering and output of screen data for the activated application 151. For application selection, the application supporter 161 may output icons or menu items associated with the applications 151 stored in the storage unit 150 on the display unit 140. When the user selects an item, the application supporter 161 may invoke an application 151 associated with the selected item from the storage unit 150 and activate the application 151. In addition, the application supporter 161 may identify a control key map for manipulation of the application 151, and map the control key map to the input unit 120 or output the control key map as a virtual touch map on the display unit 140. In particular, to manage screen data of an activated application 151, the application supporter 161 may create a screen list of screen layers forming the activated application 151. That is, for example, when screen data is composed of an indicator region, a wallpaper region and an execution region, the application supporter 161 may send data of the regions to window buffers 167 via the operation supporter 165. To this end, the application supporter 161 may obtain window buffers 167 according to screen rendering. When an application 151 is activated, the application supporter 161 may create a list of screen layers forming the application 151 (screen list) and provide the screen list to the composite window manager 163.

When an application 151 is activated, at least one window buffer 167 is allocated to accommodate screen data to be output. In particular, when a screen is composed of multiple screen layers, window buffers 167 may be allocated so as to correspond to individual screen layers, and each screen layer may be written to a corresponding window buffer 167. Data written in window buffers 167 may be written to combined screen buffers 169 under control of the composite window manager 163.

Combined screen buffers 169 are buffers used to output data written in window buffers 167 to the display unit 140 and the screen output device 200. When the screen output device 200 is connected with the mobile terminal 100, combined screen buffers 169 are configured so as to provide screen data to the display unit 140 and the screen output device 200. When the screen output device 200 is disconnected from the mobile terminal 100, combined screen buffers 169 are configured so as to provide screen data to the display unit 140. Combined screen buffers 169 may be allocated and deallocated according to screen data to be output. To support screen update to either the display unit 140 or the screen output device 200, sections of combined screen buffers 169 may be locked.

The operation supporter 165 performs window buffer allocation so that the application supporter 161 may obtain window buffers 167 for screen rendering of an activated application 151 and write screen data to the obtained window buffers 167. Screen data written to window buffers 167 may be composed of multiple screen layers corresponding to various screen regions. In addition, the operation supporter 165 may notify the composite window manager 163 of allocation of window buffers 167. The operation supporter 165 may support graphics update of combined screen buffers 169 under control of the composite window manager 163.

When an application 151 is activated by the application supporter 161 and corresponding window buffers 167 are allocated, the composite window manager 163 composites the window buffers 167 on the basis of a screen list composed of screen layers. For example, assume that two applications are activated. When a first application is set or requested to output to the display unit 140, the composite window manager 163 composites window buffers 167 allocated to the first application into a screen image, which is output to the display unit 140. When a second application is set or requested to output to the screen output device 200, the composite window manager 163 composites window buffers 167 allocated to the second application into a screen image, which is output to the screen output device 200. Here, the composite window manager 163 may write a first composited screen image into a section of a combined screen buffer 169 for output to the display unit 140, write a second composited screen image into another section of the combined screen buffer 169 for output to the screen output device 200, and cause screen data written in the combined screen buffer 169 to be sent to the display unit 140 and the screen output device 200. In addition, the composite window manager 163 may perform screen data change or replacement and screen switching between the display unit 140 and screen output device 200 according to input events.

When the screen output device 200 is disconnected, the composite window manager 163 may deallocate window buffers 167 and sections of combined screen buffers 169 having been allocated to the screen output device 200. The composite window manager 163 may use window buffers 167 to composite overlapping screen layers, producing visual effects such as alpha blending and window animation.

In the control unit 160 having the above configuration, when the application supporter 161 performs screen rendering according to activation of an application 151, the operation supporter 165 applies graphics update to allocated window buffers 167 and sends a window update event to the composite window manager 163 and the composite window manager 163 performs compositing window rendering and forwards the result to the operation supporter 165. Then, the operation supporter 165 applies graphics update to a combined screen buffer 169 by copying the window buffers 167 into the combined screen buffer 169. Data in sections of the combined screen buffer 169 are output to at least one of the display unit 140 or the screen output device 200.

As described above, when the screen output device 200 is connected with the mobile terminal 100, the control unit 160 may allocate buffers for the screen output device 200 and perform window compositing and when the screen output device 200 is disconnected from the mobile terminal 100, the control unit 160 may deallocate buffers having been allocated to the screen output device 200.

Figure 4:
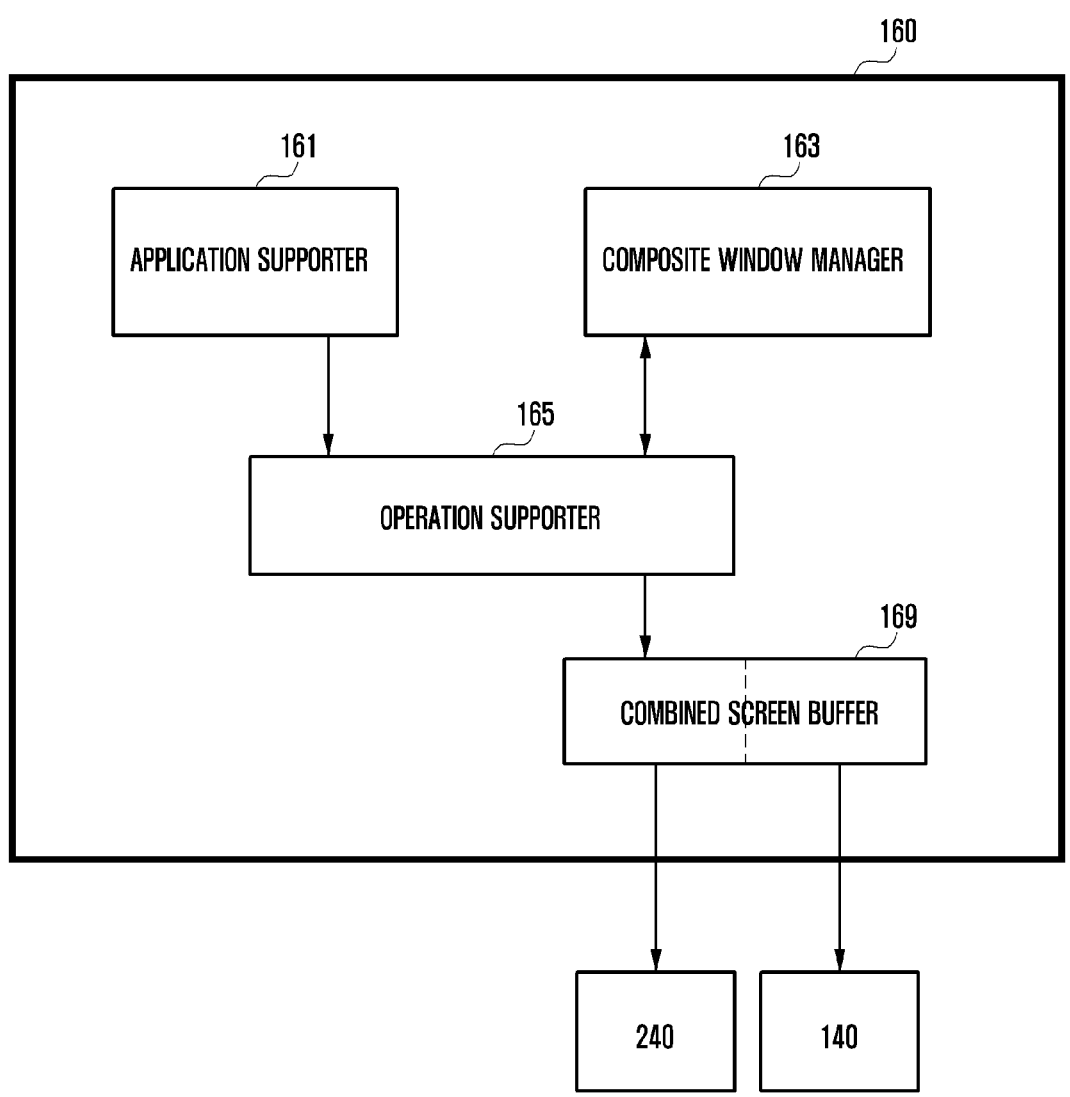
FIG. 4 illustrates a configuration of a control unit supporting screen output control according to an embodiment of the present disclosure.

FIG. 4 illustrates a configuration of a control unit supporting screen output control according to an embodiment of the present disclosure.

Referring to FIG. 4, the control unit 160 may include an application supporter 161, a composite window manager 163, an operation supporter 165, and combined screen buffers 169.

The application supporter 161, having the same structure as the application supporter 161 described in FIG. 3, may activate an application 151 according to a user request or preset schedule information, and support screen rendering according to activation of the application 151. When an input event for screen control is generated, the application supporter 161 may direct the operation supporter 165 to initiate screen rendering corresponding to the input event.

When the application supporter 161 directs rendering, the operation supporter 165 may send a window stack update event to the composite window manager 163. The application supporter 161 may detect rendering windows without use of the composite window manager 163 and window buffers 167 and directly write screen data rendered using the detected windows into a combined screen buffer 169. For example, when screen data is rendered according to activation of a first application, the application supporter 161 may write the rendered screen data into a designated section of a combined screen buffer 169. When a second application scheduled or requested to output to the screen output device 200 is activated, the application supporter 161 may write screen data rendered by the second application 151 into a section of a combined screen buffer 169 designated for the screen output device 200.

So far, a description has been given of a system and mobile terminal supporting screen output control of the present disclosure. Next, a description will be given of a screen output control method of the present disclosure through allocation, utilization and deallocation of screen buffers.

Figure 5:
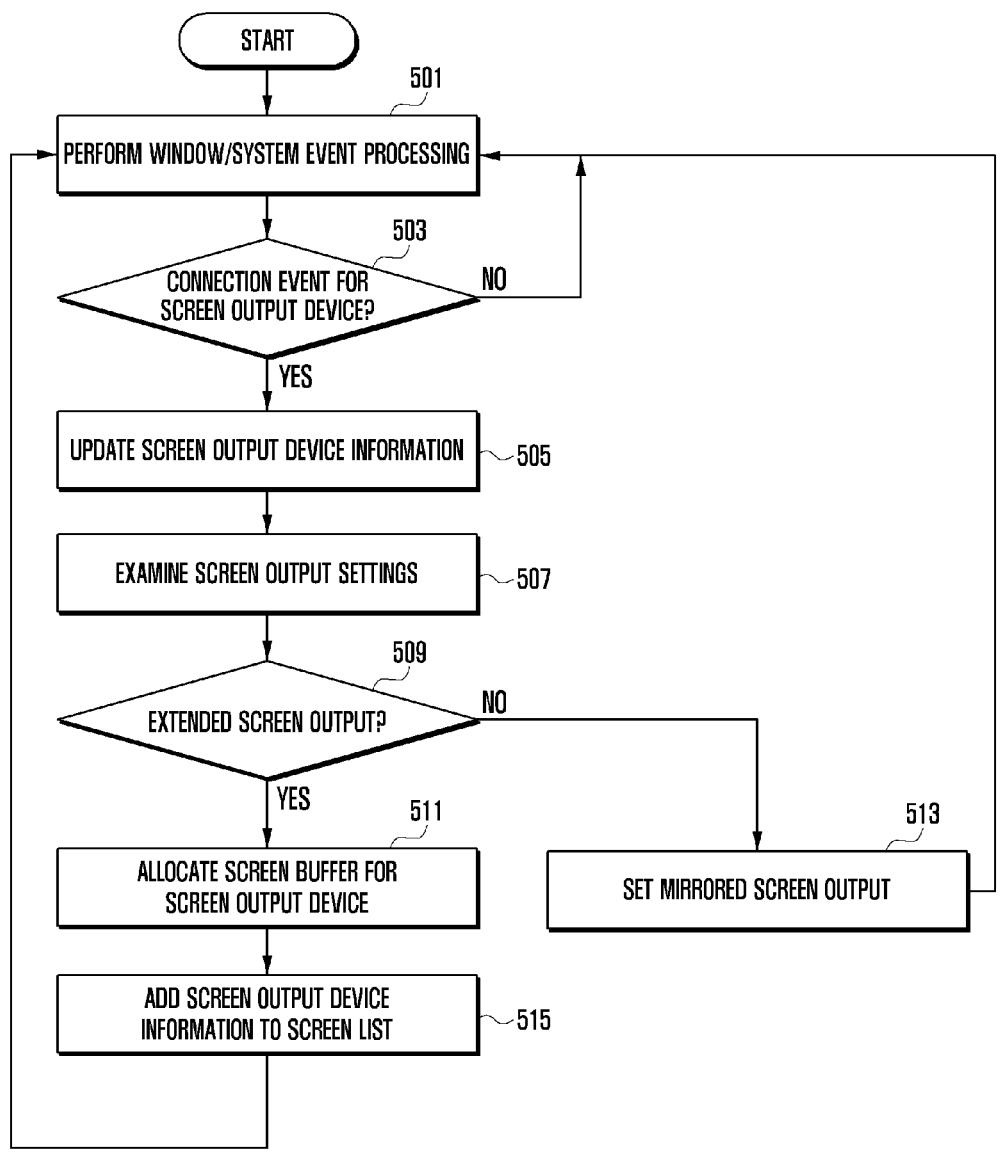
FIG. 5 is a flowchart of a procedure for screen buffer allocation in a screen output control method according to an embodiment of the present disclosure.

FIG. 5 is a flowchart of a procedure for screen buffer allocation in a screen output control method according to an embodiment of the present disclosure.

In the following description, connection of the screen output device 200 and corresponding screen output control may be described as extended screen output or a desktop mode.

Referring to FIG. 5, in a screen output control method according to an embodiment of the present disclosure, the control unit 160 of the mobile terminal 100 supplies power to individual components of the mobile terminal 100. Thereafter, at operation 501, the control unit 160 performs window/system event processing according to user input, preset schedule information or a communication event. However, it is noted that the control unit 160 may perform the window/system event processing according to other events.

At operation 503, the control unit 160 checks whether a connection event for the screen output device 200 is detected. The user may use an HDMI cable to connect the screen output device 200 to the external interface unit 170 of the mobile terminal 100 or perform other actions to establish a communication channel between the mobile terminal 100 and the screen output device 200 through a wired or wireless connection. If a connection event for the screen output device 200 is not detected, the control unit 160 returns to operation 501 and continues event processing for user function execution. Here, the external interface unit 170 may include a circuit element to detect connection of a screen output device 200.

If a connection event for the screen output device 200 is detected at operation 503, the control unit 160 proceeds to operation 505 at which the control unit 160 updates device information of the screen output device 200. That is, the control unit 160 may receive device information from the screen output device 200 and temporarily store the device information in the storage unit 150. At operation 507, the control unit 160 examines screen output settings. Here, screen output settings may be identified using device information of the screen output device 200. That is, the control unit 160 may examine device information of the screen output device 200 to identify screen size and resolution, and location and frequency to be used for the screen output device 200.

At operation 509, the control unit 160 checks whether extended screen output (or desktop mode) is set. If extended screen output is not set, the control unit 160 proceeds to operation 513 at which the control unit 160 sets mirrored screen output. When mirrored screen output is set, screen data output on the display unit 140 may be copied to the screen output device 200 without change. Here, the control unit 160 may adjust the mirror image size according to the display area 240 of the screen output device 200.

If extended screen output is set at operation 509, the control unit 160 proceeds to operation 511 at which the control unit 160 allocates a screen buffer to be used by the screen output device 200. At operation 515, the control unit 160 adds the device information of the screen output device 200 to the screen list. Here, the screen buffer to be used by the screen output device 200 may be at least one of a window buffer or a combined screen buffer to which screen data for the screen output device 200 is to be written. According to screen output modes, the screen buffer to be used by the screen output device 200 may include both a window buffer 167 and a combined screen buffer 169 or include a section of a combined screen buffer 169 only.

Figure 6:
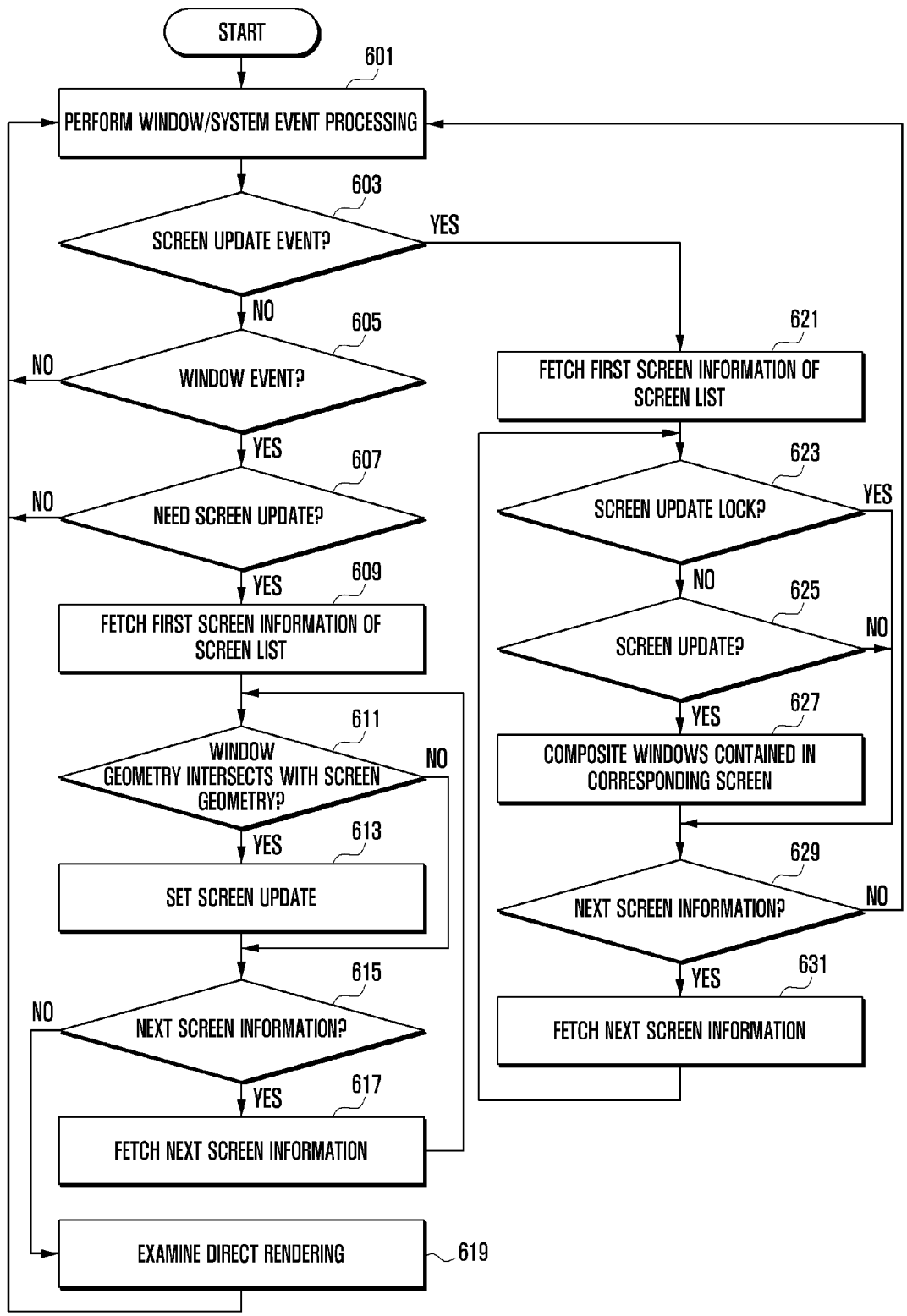
FIG. 6 is a flowchart of a procedure for window compositing on a screen basis in the screen output control method according to an embodiment of the present disclosure.

FIG. 6 is a flowchart of a procedure for window compositing on a screen basis in the screen output control method according to an embodiment of the present disclosure.

Referring to FIG. 6, in the screen output control method of the present disclosure, the composite window manager 163 of the control unit 160 may handle events for windows corresponding to screen layers to support window viewing, hiding, geometry change, stack change, and data update. More specifically, at operation 601, the control unit 160 performs window and system event processing for operation of the mobile terminal 100. That is, while performing various user functions according to preset schedule information, user requests, and other events, the control unit 160 may process window events for screen update and system events for operation of the mobile terminal 100.

At operation 603, the control unit 160 checks whether a screen update event is detected. If a screen update event is not detected, the control unit 160 proceeds to operation 605 at which the control unit 160 checks whether a window event related to screen update is detected. If a window event is not detected, the control unit 160 returns to operation 601. If a window event is detected at operation 605, the control unit 160 proceeds to operation 607 at which the control unit 160 checks whether screen update is needed according to the window event. If screen update is not needed, the control unit 160 returns to operation 601. If screen update is needed, the control unit 160 proceeds to operation 609 at which the control unit 160 fetches the first entry of the screen list. Thereafter, at operation 611, the control unit 160 checks whether the window geometry (position and size) intersects with the screen geometry. If the window geometry intersects with the screen geometry, the control unit 160 proceeds to operation 613 at which the control unit 160 sets screen update. That is, screen update setting may cause data written in a window buffer 167 to be applied to a corresponding screen. Thereafter, at operation 615, the control unit 160 checks whether the next entry is present in the screen list. If the next entry is present, the control unit 160 proceeds to operation 617 at which the control unit 160 fetches the next entry of the screen list, and returns to operation 611 and continues screen list processing. If the next entry is not present in the screen list at operation 615, the control unit 160 proceeds to operation 619 at which the control unit 160 examines use of direct rendering. Here, in direct rendering, window compositing may be not performed for windows whose geometry coincides with the screen geometry. For a screen set for direct rendering, as the application supporter 161 directly updates the corresponding combined screen buffer 169, the composite window manager 163 may set a lock on the screen.

If a screen update event is detected at operation 603, the control unit 160 proceeds to operation 621 at which the control unit 160 fetches the first entry of the screen list maintained by the composite window manager 163. Thereafter, at operation 623, the control unit 160 checks whether screen update lock is set. If screen update lock is not set, the control unit 160 proceeds to operation 625 at which the control unit 160 checks whether screen update is set. When an event for screen update setting is generated, the control unit 160 proceeds to operation 627 at which the control unit 160 performs window compositing for windows contained in the corresponding screen. When screen update lock is set or an event for screen update setting is not generated, the control unit 160 may skip operation 625 and operation 627.

Thereafter, at operation 629, the control unit 160 checks whether the next entry is present in the screen list. If the next entry is present, the control unit 160 proceeds to operation 631 at which the control unit 160 fetches the next entry of the screen list, and returns to operation 623 and continues screen list processing. If the next entry is not present at operation 629, the control unit 160 returns to operation 601 and continues event processing.

As described above, in the screen output control method of the present disclosure, for windows corresponding to screen layers forming a screen, when an event needing window update or screen update event is generated, screen update is performed by updating the windows and/or conducting window compositing. In particular, generation of a screen update event or window event is separately examined for a screen output on the display unit 140 of the mobile terminal 100 and a screen output on the screen output device 200, and screen update is also separately performed therefor. The control unit 160 need not perform screen update for a screen that does not need to be updated, so that either the screen on the display unit 140 or the screen on the screen output device 200 may be updated. Hence, the control unit 160 may update screen data only for an area needing update, increasing efficiency of screen data processing.

Figure 7:
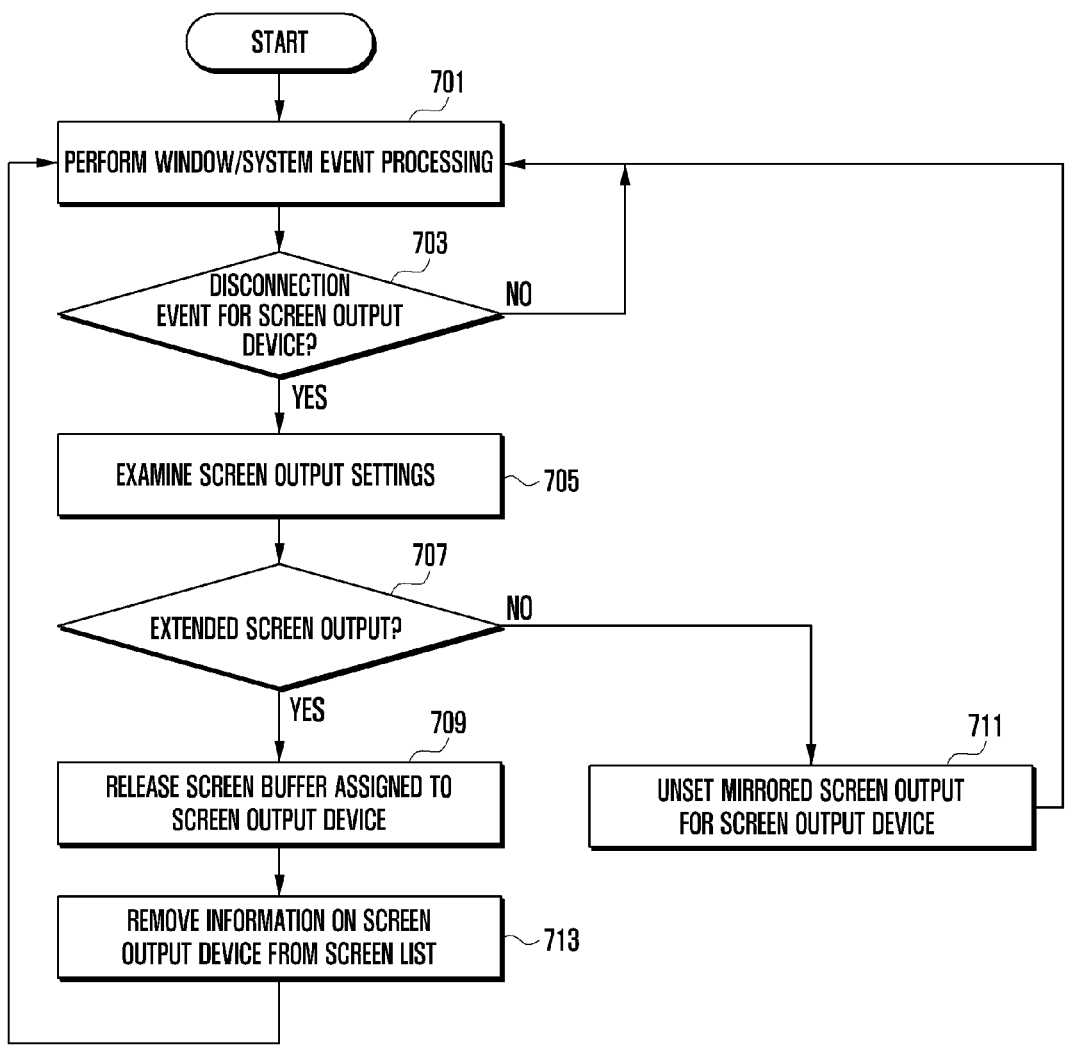
FIG. 7 is a flowchart of a procedure for deallocating a screen buffer allocated to a screen output device in the screen output control method according to an embodiment of the present disclosure.

FIG. 7 is a flowchart of a procedure for deallocating a screen buffer allocated to the screen output device in the screen output control method according to an embodiment of the present disclosure.

Referring to FIG. 7, at operation 701, the control unit 160 performs window and system event processing. For example, when an event is detected on an indicator region window, the control unit 160 may process the event on the indicator region window. That is, when an event such as received signal strength change or network detachment is generated, the control unit 160 may update status information on the indicator region window accordingly.

Thereafter, at operation 703, the control unit 160 checks whether an event indicating disconnection of the screen output device 200 is detected. If such disconnection event is not detected, the control unit 160 returns to operation 701 and continues event processing. For example, for an activated application 151, the control unit 160 may perform screen update for at least one of the display unit 140 or the screen output device 200 according to an input or control event.

If an event indicating disconnection of the screen output device 200 is detected at operation 703, the control unit 160 proceeds to operation 705 at which the control unit 160 examines screen output settings. To release screen buffers allocated to the screen output device 200 and terminate functions activated for information output thereto, the control unit 160 may examine screen output settings. At operation 707, the control unit 160 checks whether extended screen output is set. If extended screen output is not set, the control unit 160 proceeds to operation 711 at which the control unit 160 unsets mirrored screen output for the screen output device 200 in disconnection.

If extended screen output is set at operation 707, the control unit 160 proceeds to operation 709 at which the control unit 160 deallocates a screen buffer having been allocated to the screen output device 200. For example, the control unit 160 may release window buffers 167 and combined screen buffer sections allocated to the screen output device 200, and adjust use of window buffers 167 and combined screen buffers 169 in accordance with the display unit 140. Thereafter, at operation 713, the control unit 160 removes information on the screen output device 200 in disconnection from the screen list maintained by the composite window manager 163.

Figure 8:
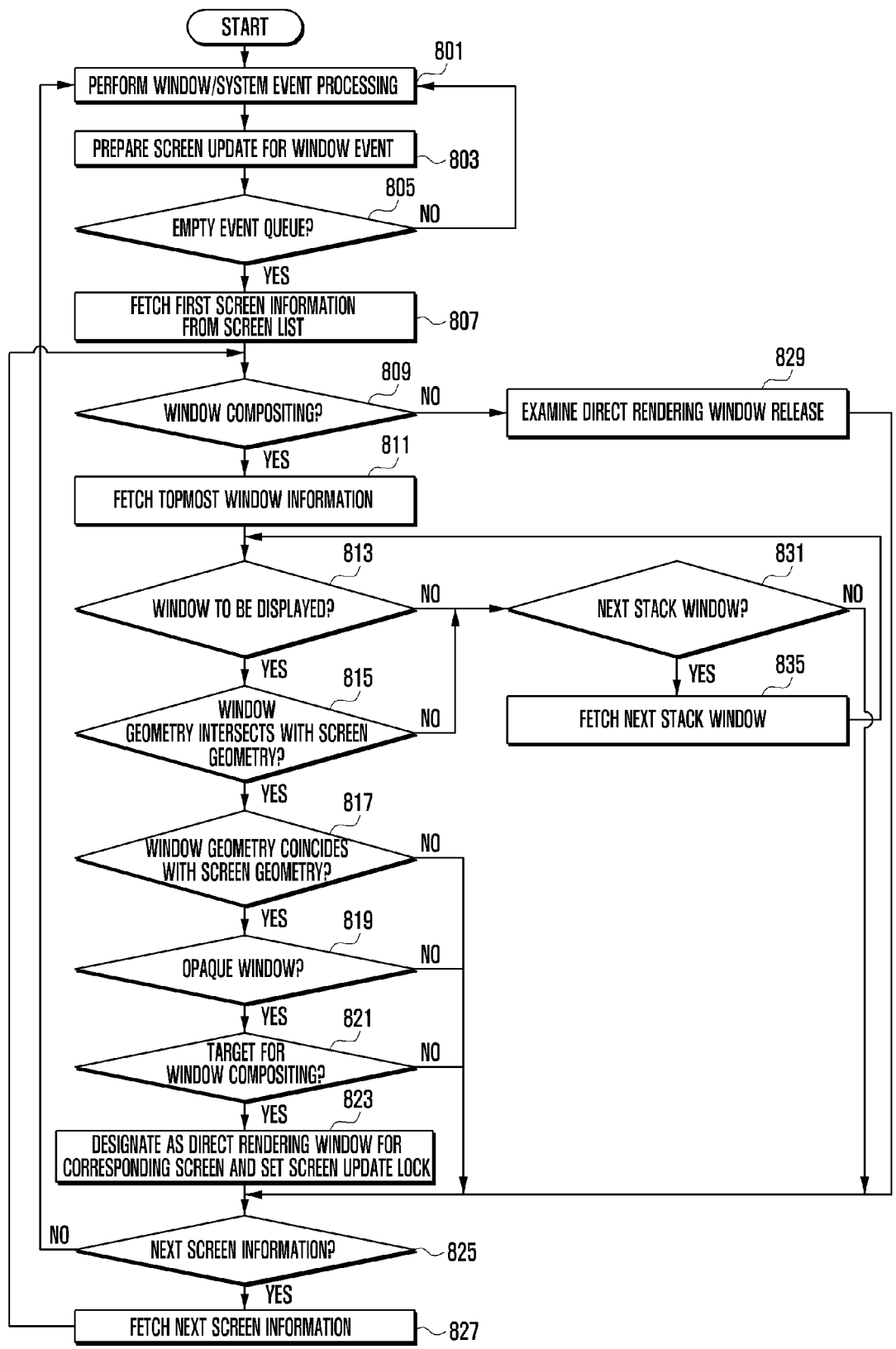
FIG. 8 is a flowchart of a procedure for direct rendering mode examination in the screen output control method according to an embodiment of the present disclosure.

FIG. 8 is a flowchart of a procedure for direct rendering mode examination in the screen output control method according to an embodiment of the present disclosure.

Referring to FIG. 8, to support direct rendering, at operation 801, the control unit 160 performs window and system event processing. At operation 803, the control unit 160 prepares screen update for a window event. At operation 805, for efficient event processing, the control unit 160 checks whether the event queue managed by the composite window manager 163 is empty. If the event queue is not empty, the control unit 160 returns to operation 801.

If the event queue is empty, the control unit 160 proceeds to operation 807 at which the control unit 160 fetches the first screen from the screen list. At operation 809, the control unit 160 checks whether window compositing is set. If window compositing is set, the control unit 160 proceeds to operation 811 at which the control unit 160 fetches the topmost window. At operation 813, the control unit 160 checks whether the fetched window is a window to be displayed. If the window is a window to be displayed, the control unit 160 proceeds to operation 815 at which the control unit 160 checks whether the window geometry (position and size) intersects with the screen geometry. If the window geometry intersects with the screen geometry, the control unit 160 proceeds to operation 817 at which the control unit 160 checks whether the window geometry coincides with the screen geometry. If the window geometry coincides with the screen geometry, the control unit 160 proceeds to operation 819 at which the control unit 160 checks whether the fetched window is an opaque window. If the window is an opaque window, the control unit 160 proceeds to operation 821 at which the control unit 160 checks whether the window is a target for window compositing. If the window is a target for window compositing, the control unit 160 proceeds to operation 823 at which the control unit 160 designates the window as a direct rendering window for the corresponding screen and sets a screen update lock. Thereafter, at operation 825, the control unit 160 checks whether the next screen is present in the screen list. If the next screen is not present, the control unit 160 returns to operation 801. If the next screen is present, the control unit 160 proceeds to operation 827 at which the control unit 160 fetches the next screen, and returns to operation 809 to continue screen list processing.

If window compositing is not set at operation 809, the control unit 160 proceeds to operation 829 at which the control unit 160 performs direct rendering window release examination. Direct rendering window release examination may be performed when direct rendering is applied to the corresponding screen. If the window is not a window to be displayed at operation 813, the control unit 160 proceeds to operation 831 at which the control unit 160 checks whether the next stack window is present. If the next stack window is present, the control unit 160 proceeds to operation 835 at which the control unit 160 fetches the next stack window, and returns to operation 813. When a request for direct rendering window release is received, window buffers may be allocated and screen output may be processed based on the window buffers as described before.

Figure 9:
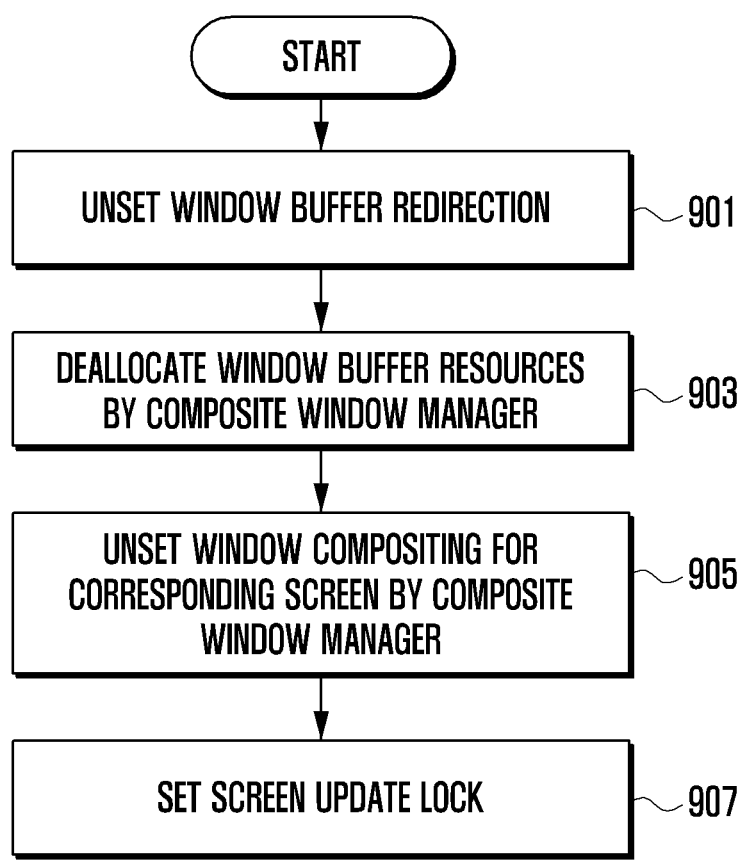
FIG. 9 is a flowchart of a procedure for direct rendering window allocation in the screen output control method according to an embodiment of the present disclosure.

FIG. 9 is a flowchart of a procedure for direct rendering window allocation in the screen output control method according to an embodiment of the present disclosure.

Referring to FIG. 9, in direct rendering window allocation for screen output control, at operation 901, the control unit 160 unsets window buffer redirection. At operation 903, the control unit 160 directs the composite window manager 163 to deallocate window buffer resources. At operation 905, the control unit 160 directs the composite window manager 163 to unset window compositing for the corresponding screen. Thereafter, at operation 907, the control unit 160 sets a screen update lock. In other words, when the application supporter 161 activates an application 151, the control unit 160 releases window buffer redirection without allocation of window buffers 167 so that the composite window manager 163 may deallocate window buffer resources. In addition, the control unit 160 unsets window compositing for the composite window manager 163 so that the application supporter 161 may obtain combined screen buffer sections needed according to application activation. As the application supporter 161 updates information written in a designated section of a combined screen buffer 169, the control unit 160 sets a screen update lock so that the composite window manager 163 may suppress screen update.

Figure 10:
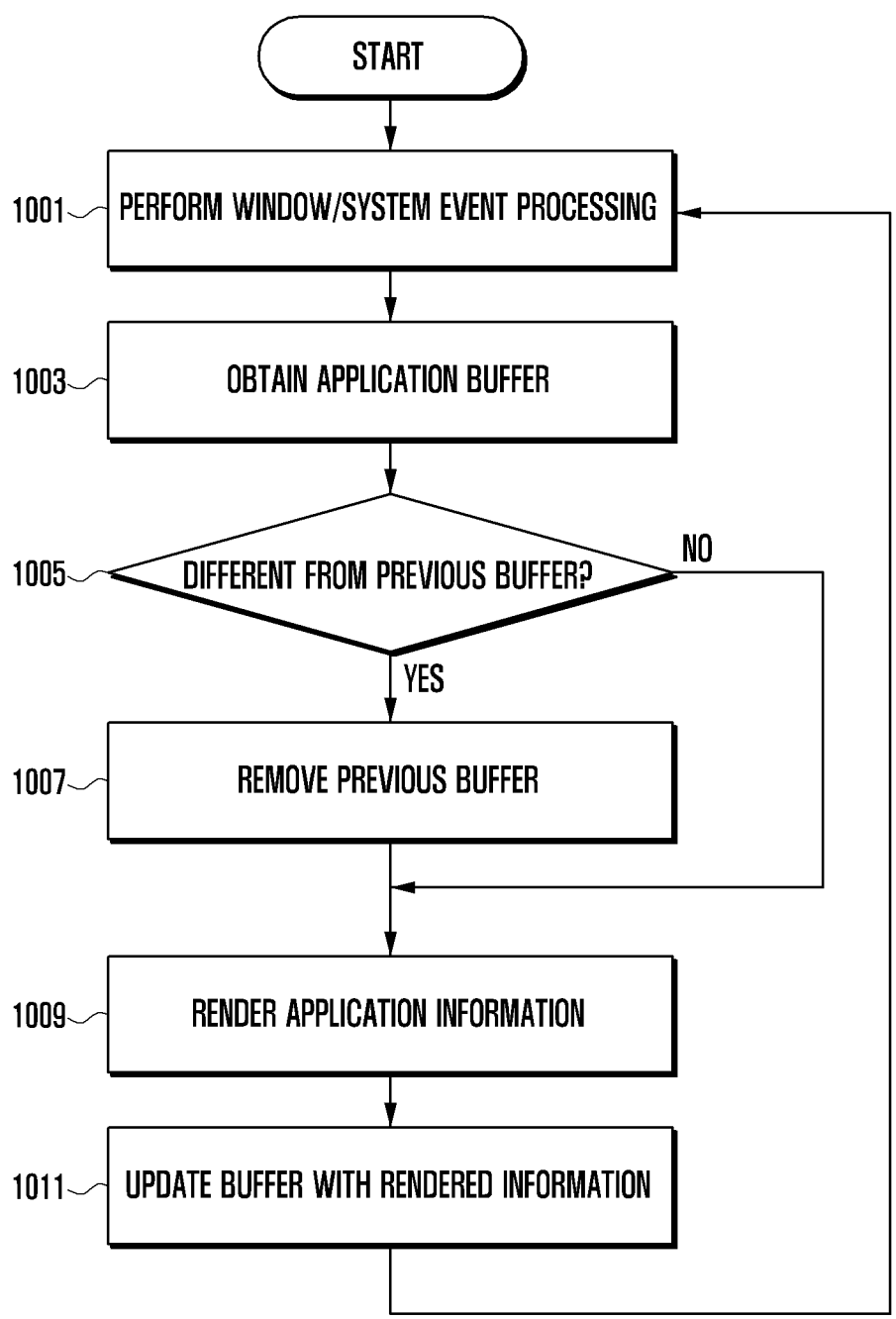
FIG. 10 is a flowchart of a procedure for application buffer switching in the screen output control method according to an embodiment of the present disclosure.

FIG. 10 is a flowchart of a procedure for application buffer switching in the screen output control method according to an embodiment of the present disclosure.

Referring to FIG. 10, in buffer management performed by the application supporter 161, at operation 1001, the control unit 160 performs window and system event processing. At operation 1003, upon detection of an event for screen output to the screen output device 200, the control unit 160 directs the application supporter 161 to obtain an application buffer. Here, the application buffer may be a section of a combined screen buffer 169 to which the application supporter 161 is allowed to directly write information produced by an activated application 151.

Upon acquisition of a buffer to be used by the application 151, at operation 1005, the control unit 160 checks whether the obtained buffer is different from the previous buffer. If the obtained buffer is different from the previous buffer, the control unit 160 proceeds to operation 1007 at which the control unit 160 removes the previous buffer. If the obtained buffer is identical to the previous buffer, operation 1007 is skipped.

Thereafter, at operation 1009, the control unit 160 renders information produced by the application 151. At operation 1011, the control unit 160 updates the buffer with the rendered information. As described above, the application supporter 161 may obtain a buffer from the system before execution of an application 151.

As described above, the control unit 160 examines window redirection setting to permit the application supporter 161 to obtain either a window buffer or a combined screen buffer section, so that rendered data may be output through window compositing or be directly written to the combined screen buffer section.

Figure 11:
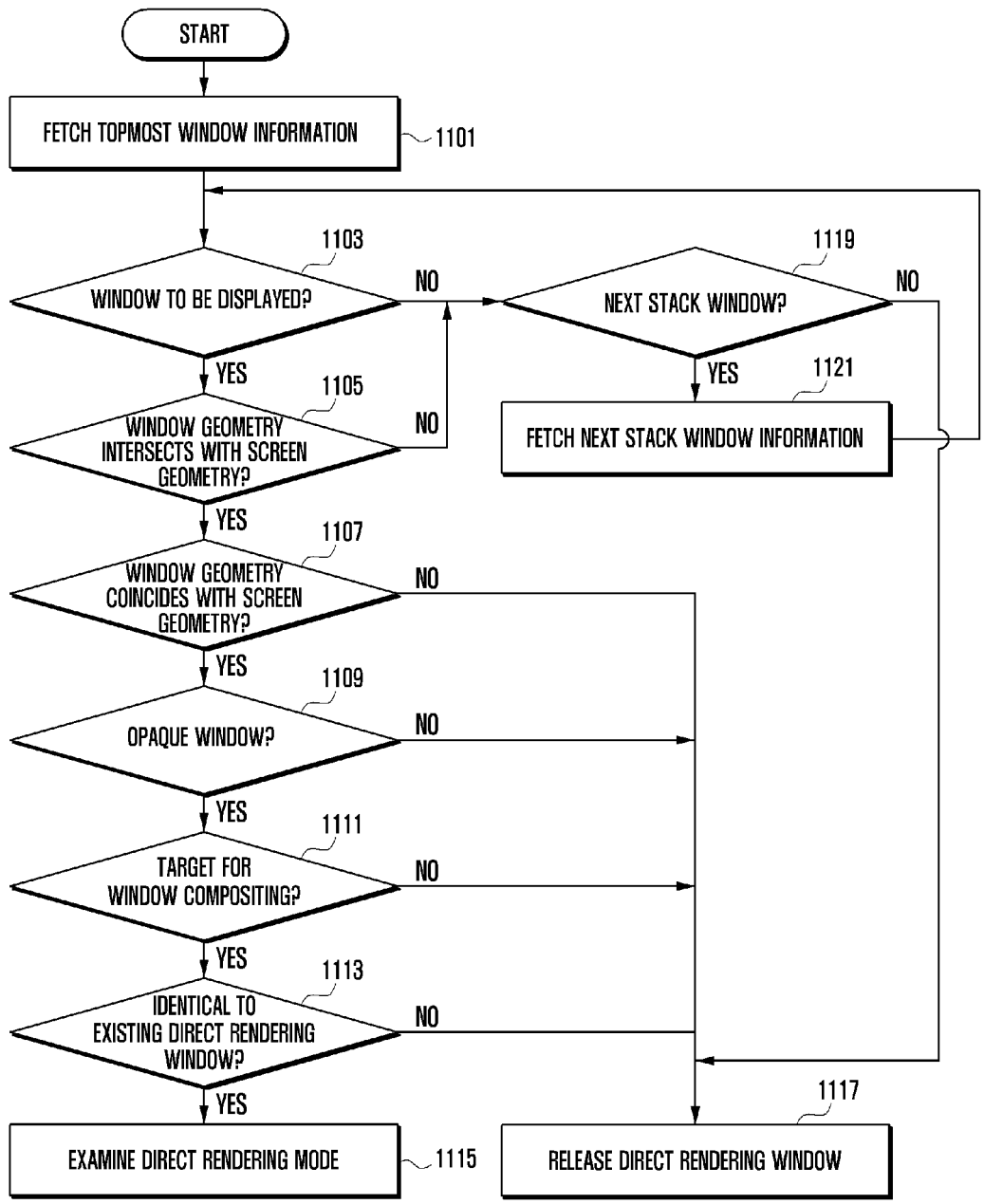
FIG. 11 is a flowchart of a procedure for examining direct rendering window deallocation in the screen output control method according to an embodiment of the present disclosure.

FIG. 11 is a flowchart of a procedure for examining direct rendering window deallocation in the screen output control method according to an embodiment of the present disclosure.

Referring to FIG. 11, in examination for direct rendering window release, at operation 1101, the control unit 160 fetches the topmost window. At operation 1103, the control unit 160 checks whether the fetched window is a window to be displayed. If the window is a window to be displayed, the control unit 160 proceeds to operation 1105 at which the control unit 160 checks whether the window geometry intersects with the screen geometry. If the window geometry intersects with the screen geometry, the control unit 160 proceeds to operation 1107 at which the control unit 160 checks whether the window geometry coincides with the screen geometry. If the window geometry coincides with the screen geometry, the control unit 160 proceeds to operation 1109 at which the control unit 160 checks whether the window is an opaque window. If the window is an opaque window, the control unit 160 proceeds to operation 1111 at which the control unit 160 checks whether the window is a target for window compositing. If the window is a target for window compositing, the control unit 160 proceeds to operation 1113 at which the control unit 160 checks whether the window is identical to an existing direct rendering window. If the window is identical to an existing direct rendering window, the control unit 160 proceeds to operation 1115 at which the control unit 160 maintains the direct rendering mode.

In contrast, if the window geometry does not coincide with the screen geometry at operation 1107, if the fetched window is not an opaque window at operation 1109, if the window is not a target for window compositing at operation 1111, or if the window is not identical to an existing direct rendering window, then the control unit 160 proceeds to operation 1117 at which the control unit 160 releases the direct rendering window. In addition, if the fetched window is not a window to be displayed at operation 1103 or if the window geometry does not intersect with the screen geometry at operation 1105, the control unit 160 proceeds to operation 1109 at which the control unit 160 checks whether the next stack window is present. If the next stack window is not present, the control unit 160 proceeds to operation 1117 at which the control unit 160 releases the direct rendering window. If the next stack window is present, the control unit 160 proceeds to operation 1121 at which the control unit 160 fetches the next stack window, and returns to operation 1103 to continue window processing.

Figure 12:
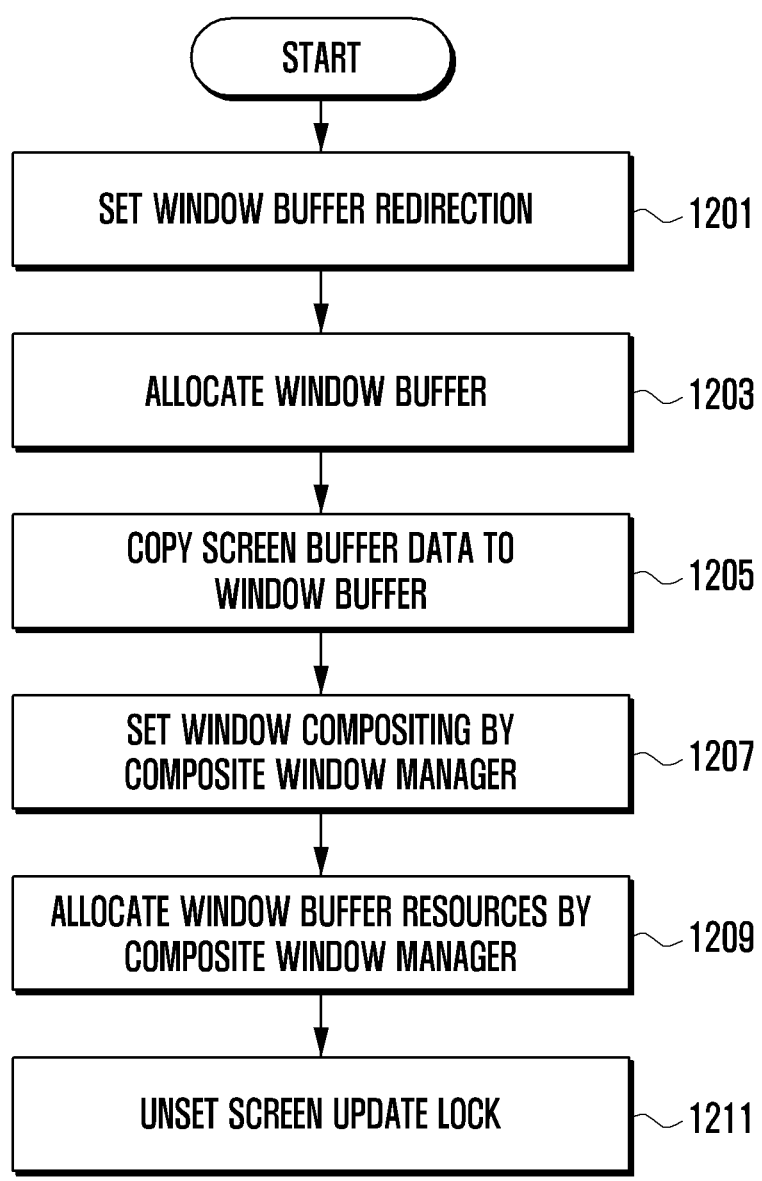
FIG. 12 is a flowchart of a procedure for direct rendering window deallocation in the screen output control method according to an embodiment of the present disclosure.

FIG. 12 is a flowchart of a procedure for direct rendering window deallocation in the screen output control method according to an embodiment of the present disclosure.

Referring to FIG. 12, in direct rendering window deallocation for screen output control, at operation 1201, the control unit 160 sets window buffer redirection. At operation 1203, the control unit 160 allocates window buffers 167. At operation 1205, the control unit 160 copies screen buffer data to the window buffers 167. At operation 1207, the control unit 160 directs the composite window manager 163 to set a window compositing mode. At operation 1209, the control unit 160 directs the composite window manager 163 to allocate window buffer resources. Thereafter, at operation 1211, the control unit 160 unsets a screen update lock.

That is, when the direct rendering window is released, the control unit 160 may support screen information processing on the basis of window compositing through the composite window manager 163.

The mobile terminal may further include various components according to design. For example, although not shown, the mobile terminal may further include a local area communication module for local area communication, a data communication interface based on wired and wireless communication, an Internet communication module for Internet access and communication, and a digital broadcast reception module for receiving and playing digital broadcasts. Although possible variations according to the trend of digital convergence are too numerous to enumerate, it should be apparent to those skilled in the art that the mobile terminal may further include a unit comparable to the above-described units, and one unit of the mobile terminal may be removed or replaced with another unit.

The mobile terminal of the present disclosure may be any information and communication appliance or multimedia appliance, such as a mobile communication terminal based on communication protocols supporting various communication systems, a Portable Multimedia Player (PMP), a digital broadcast receiver, a Personal Digital Assistant (PDA), a music player like an MP3 player, a portable game console, a smartphone, a laptop computer, or a handheld computer.

Hereinabove, various embodiments of the present disclosure have been described with reference to the accompanying drawings. Specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A method for screen output control, the method comprising:
    detecting, by a mobile terminal including a mobile display area, a connection with a screen output device including a display area separate from the mobile display area;
    allocating, by the mobile terminal, window buffers of the mobile terminal to the screen output device;
    locking one or more sections of a screen buffer in response to the detection of the connection of the screen output device, the screen buffer comprising a combined screen buffer configured to output data to the mobile display area and the display area of the screen output device;
    writing, according to a rendering of an application running on the mobile terminal, one or more windows, which form a screen to be output to the screen output device, to the window buffers;
    compositing the one or more windows written to the window buffers;
    copying information representing the composited one or more windows to the screen buffer; and
    outputting the information copied to the screen buffer to the display area of the screen output device.

2. The method of claim 1, wherein the compositing of the one or more windows comprises writing the information representing the composited windows to a section of the screen buffer assigned to the screen output device.

3. The method of claim 1, further comprising:
    writing, according to a rendering of an application scheduled to output to the mobile terminal, one or more windows, which form a screen to be output to the mobile display area of the mobile terminal, to window buffers assigned to the mobile display area;
    copying information written in the window buffers assigned to the mobile display area to a section of the screen buffer assigned to the mobile display area; and
    outputting the information copied to the section of the screen buffer assigned to the mobile display area of the mobile terminal to the mobile display area.

4. The method of claim 1, further comprising:
    disconnecting the screen output device from the mobile terminal; and
    releasing the window buffers and a section of the screen buffer assigned to the screen output device.

5. The method of claim 4, further comprising:
    removing an item registered for a screen output of the screen output device from a screen list.

6. The method of claim 1, further comprising:
    determining, by the mobile terminal subsequent to the detection of the connection, whether an output mode of the mobile terminal is set for an extended screen output mode or a mirrored screen output mode.

7. A method for screen output control, the method comprising:
    detecting a connection of a screen output device including a display area with a mobile terminal including a mobile display area separate from the display area of the screen output device;
    allocating, according to a rendering of an application running on the mobile terminal, a section of a screen buffer to which one or more windows, which form a screen to be output to the screen output device, are to be written;
    locking the allocated section of the screen buffer in response to the detection of the connection of the screen output device, the screen buffer comprising a combined screen buffer configured to output data to the mobile display area and the display area of the screen output device;
    writing information representing rendered windows directly to the allocated section of the screen buffer; and
    outputting the information written to the allocated section of the screen buffer to the display area of the screen output device.

8. The method of claim 7, further comprising:
    allocating, according to a rendering of an application scheduled to output to the mobile display area of the mobile terminal, a section of the screen buffer to which one or more windows, which form a screen to be output to the mobile display area of the mobile terminal, are to be written;
    writing information representing windows to be output to the mobile display area of the mobile terminal to a section of the screen buffer assigned to the mobile display area; and
    outputting the information written to the section of the screen buffer assigned to the mobile display area of the mobile terminal to the mobile display area.

9. The method of claim 8, further comprising:
    detecting a termination of direct writing to the screen buffer; and
    allocating window buffers for the mobile display area of the mobile terminal and the display area of the screen output device.

10. The method of claim 7, further comprising:
    disconnecting the screen output device from the mobile terminal; and
    releasing a section of the screen buffer assigned to the screen output device.

11. The method of claim 10, further comprising:
    removing an item registered for a screen output of the screen output device from a screen list.

12. A mobile terminal supporting screen output control, the mobile terminal comprising:
    a mobile display area;
    window buffers;
    a screen buffer;
    an external interface unit configured to support a connection with a screen output device including a display area that is separate from the mobile display area of the mobile terminal; and
    a control unit configured to:
        detect the connection with the screen output device,
        allocate, when the screen output device is connected with the mobile terminal, the window buffers to the screen output device,
        lock one or more sections of the screen buffer in response to the detection of the connection of the screen output device, the screen buffer comprising a combined screen buffer configured to output data to the mobile display area and the display area of the screen output device, write, according to a rendering of an application running on the mobile terminal, one or more windows, which form a screen to be output to the screen output device, to the window buffers, composite the one or more windows written to the window buffers, copy information representing the composited one or more windows to the screen buffer, and output the information copied to the screen buffer to the display area of the screen output device.

13. The mobile terminal of claim 12, wherein the control unit is further configured to:

write the information representing the composited windows to a section of the screen buffer assigned to the screen output device.

14. The mobile terminal of claim 12, wherein the display area is configured to output screen data related to an operation of the mobile terminal, and wherein the control unit is further configured to:

write, according to a rendering of an application scheduled to output to the mobile display area, one or more windows, which form a screen to be output to the mobile display area, to window buffers assigned to the mobile display area, copy information written in the window buffers assigned to the mobile display area to a section of the screen buffer assigned to the mobile display area, and output the information copied to the section of the screen buffer assigned to the mobile display area to the mobile display area.

15. The mobile terminal of claim 12, wherein, when the screen output device is disconnected, the control unit is further configured to release the window buffers and a section of the screen buffer assigned to the screen output device.

16. The mobile terminal of claim 12, wherein the control unit is further configured to:

register an item for a screen output of the screen output device in a screen list, when the screen output device is connected; and remove the item registered for the screen output of the screen output device from the screen list, when the screen output device is disconnected.

17. A mobile terminal supporting screen output control, the mobile terminal comprising:

a mobile display area;

a screen buffer;

an external interface unit configured to support a connection with a screen output device including a display area that is separate from the mobile display area of the mobile terminal; and a control unit configured to, when the screen output device is connected with the external interface unit:

detect the connection with the screen output device, allocate, according to a rendering of an application running on the mobile terminal, a section of the screen buffer to which one or more windows, which form a screen to be output to the screen output device, are to be written, lock one or more sections of the screen buffer in response to the detection of the connection of the screen output device, the screen buffer comprising a combined screen buffer configured to output data to the mobile display area and the display area of the screen output device, write information representing rendered windows directly to the allocated section of the screen buffer, and output the information written to the allocated section of the screen buffer to the display area of the screen output device.

18. The mobile terminal of claim 17, wherein the mobile display area is configured to output screen data related to an operation of the mobile terminal, and wherein the control unit is further configured to:

allocate, according to a rendering of an application scheduled to output to the mobile display area, a section of the screen buffer to which one or more windows, which form a screen to be output to the mobile display area, are to be written;

write information representing windows to be output to the mobile display area to a section of the screen buffer assigned to the mobile display area; and output the information written to the section of the screen buffer assigned to the mobile display area to the mobile display area.

19. The mobile terminal of claim 18, wherein, when a termination of direct writing to the screen buffer is detected, the control unit is further configured to allocate window buffers for the mobile display area and the display area of the screen output device.

20. The mobile terminal of claim 17, wherein, when the screen output device is disconnected, the control unit is further configured to release a section of the screen buffer assigned to the screen output device.

21. The mobile terminal of claim 17, wherein the control unit is further configured to:

register an item for a screen output of the screen output device in a screen list, when the screen output device is connected; and remove the item registered for the screen output of the screen output device from the screen list, when the screen output device is disconnected.

22. A screen output control system comprising:

a screen output device including a display area; and a mobile terminal including a mobile display area separate from the display area of the screen output device, wherein the screen output device is connected with the mobile terminal so as to display, on the display area, screen data rendered by the mobile terminal, and wherein, when the screen output device is connected to the mobile terminal, the mobile terminal is configured to:

detect the connection with the screen output device, lock one or more sections of a buffer in response to the detection of the connection of the screen output device, the buffer comprising a combined screen buffer configured to output data to the mobile display area and the display area of the screen output device, render screen data for the screen output device, write the rendered screen data to a section of the buffer of the mobile terminal assigned to the screen output device, and output the screen data written to the section of the buffer assigned to the screen output device to the screen output device.

\* \* \* \* \*